(12) United States Patent
Aoyagi et al.

(10) Patent No.: US 10,247,819 B2
(45) Date of Patent: Apr. 2, 2019

(54) RADAR SYSTEM

(71) Applicants: Furukawa Electric Co., Ltd., Tokyo (JP); Furukawa Automotive Systems Inc., Shiga (JP)

(72) Inventors: Yasushi Aoyagi, Tokyo (JP); Hiroki Hirayama, Tokyo (JP); Hiroyasu Yano, Tokyo (JP)

(73) Assignees: FURUKAWA ELECTRIC CO., LTD, Tokyo (JP); FURUKAWA AUTOMOTIVE SYSTEMS, INC., Shiga (JP)

( * ) Notice: Subject to any disclaimer, the term of this patent is extended or adjusted under 35 U.S.C. 154(b) by 502 days.

(21) Appl. No.: 14/926,142

(22) Filed: Oct. 29, 2015

(65) Prior Publication Data

US 2016/0109568 A1    Apr. 21, 2016

Related U.S. Application Data

(63) Continuation of application No. PCT/JP2013/062709, filed on May 1, 2013.

(51) Int. Cl.
*G01S 13/87*    (2006.01)
*G01S 13/93*    (2006.01)
(Continued)

(52) U.S. Cl.
CPC .............. *G01S 13/878* (2013.01); *G01S 7/03* (2013.01); *G01S 13/931* (2013.01); *G01S 13/42* (2013.01); *G01S 2013/9375* (2013.01)

(58) Field of Classification Search
CPC ................. G01S 13/931; G01S 13/878; G01S 2013/9375; G01S 7/03
See application file for complete search history.

(56) References Cited

U.S. PATENT DOCUMENTS 5,087,918 A * 2/1992 May .................... G01S 13/931
                                                           340/435
5,940,011 A    8/1999 Agravante et al.
(Continued)

FOREIGN PATENT DOCUMENTS

CN          102655403 A      9/2012
DE    10 2011 075 552 A1    11/2012
(Continued)

OTHER PUBLICATIONS

Office Action from Corresponding Chinese Application No. 201380076190.9; dated Oct. 9, 2016.
(Continued)

*Primary Examiner* — Matthew M Barker
(74) *Attorney, Agent, or Firm* — Pearne & Gordon LLP

(57) ABSTRACT

A radar system includes a plurality of radar devices each having a transmitting unit that transmits a high frequency signal to an object, a receiving unit that receives a signal reflected from the object, an individual control unit that controls transmission and reception timings, and a converting unit that converts an output of the receiving unit into digital data, and a central processing device having an integration process unit that processes information transmitted from the radar devices in association with positional information of the radar devices, a command control unit that controls operation timings of the individual control units, and a detection process unit that performs a process for detecting the object on the digital data before being processed by the integration process unit. Digital communication isolated from the transmission and reception timing controls at the individual control unit is performed between the radar devices and the central processing device.

3 Claims, 7 Drawing Sheets

(51) Int. Cl.
*G01S 7/03* (2006.01)
*G01S 13/42* (2006.01)

(56) References Cited

U.S. PATENT DOCUMENTS

| | | | |
|---|---|---|---|
| 7,492,313 B1 | 2/2009 | Ehret et al. | |
| 8,818,703 B2* | 8/2014 | Harada | B60R 21/0134 342/173 |
| 2005/0046606 A1 | 3/2005 | Yoneda | |
| 2007/0200747 A1 | 8/2007 | Okai et al. | |
| 2008/0260019 A1 | 10/2008 | Aoyagi | |
| 2009/0135048 A1* | 5/2009 | Jordan | G01S 7/411 342/70 |
| 2010/0097263 A1 | 4/2010 | Vacanti | |
| 2012/0116663 A1 | 5/2012 | Tsunekawa | |
| 2012/0223743 A1 | 9/2012 | Burcea | |
| 2015/0002330 A1 | 1/2015 | Binzer et al. | |

FOREIGN PATENT DOCUMENTS

| | | |
|---|---|---|
| EP | 1 826 586 A1 | 8/2007 |
| JP | H05-51870 B2 | 12/1989 |
| JP | H08-105963 A | 4/1996 |
| JP | H08-166448 A | 6/1996 |
| JP | 2002-372577 A | 12/2002 |
| JP | 2003-016592 A | 1/2003 |
| JP | 2003-107151 A | 4/2003 |
| JP | 2005-077302 A | 3/2005 |
| JP | 2006-125947 A | 5/2006 |
| JP | 2007-033156 A | 2/2007 |
| JP | 2007-232498 A | 9/2007 |
| JP | 2008-003779 A | 1/2008 |
| JP | 2008-039616 A | 2/2008 |
| JP | 2008-152391 A | 7/2008 |
| JP | 2009-535625 A | 10/2009 |
| JP | 2009-294930 A | 12/2009 |
| JP | 2010-101890 A | 5/2010 |
| JP | 2010-175555 A | 8/2010 |
| JP | 2010-230473 A | 10/2010 |
| WO | 2007-139131 A1 | 12/2007 |

OTHER PUBLICATIONS

Extended European Search Report from Corresponding European Application No. 13883795.0; dated Nov. 22, 2016.
Steinhauer, et al.; "Millimeter-Wave-Radar Sensor Based on a Transceiver Array for Automotive Allications;" IEEE Transactions on Microwave Theory and Techniques; vol. 56, No. 2; Dated Feb. 2008; pp. 261-269.
Koltz, et al.; "A 24 GHz short range radar network for automotive applications;" Radar, 2001 CIE International Conference on Oct. 15, 2001; pp. 115-119.
Bloecher, et al.; "79 GHz UWB automotive short range radar—Spectrum allocation and technology trends"; Advances in Radio Science; vol. 7; pp. 61-65; Dated 2009.
International Search Report for Corresponding Application No. PCT/JP2013/062709; dated Jul. 30, 2013.
Office Action for Corresponding Application No. JP2014-543032; dated Aug. 24, 2015.
International Preliminary Report on Patentability for Corresponding Application No. PCT/JP2013/062709; dated Nov. 3, 2015.
Written Opinion for Corresponding Application No. PCT/JP2013/062709; dated Jul. 30, 2013.
Final Office Action for Corresponding Application No. JP2014-543032; dated Nov. 30, 2015.
Notification of Granting dated Jun. 1, 2017 in Corresponding Chinese Application No. 201380076190.9 with English translation.
Decision to Grant a Patent From Corresponding Japanese Application No. JP 2014-543032; dated Mar. 8, 2016.
European Office Action dated Jan. 15, 2019 for corresponding European Application No. 13883795.0.

* cited by examiner

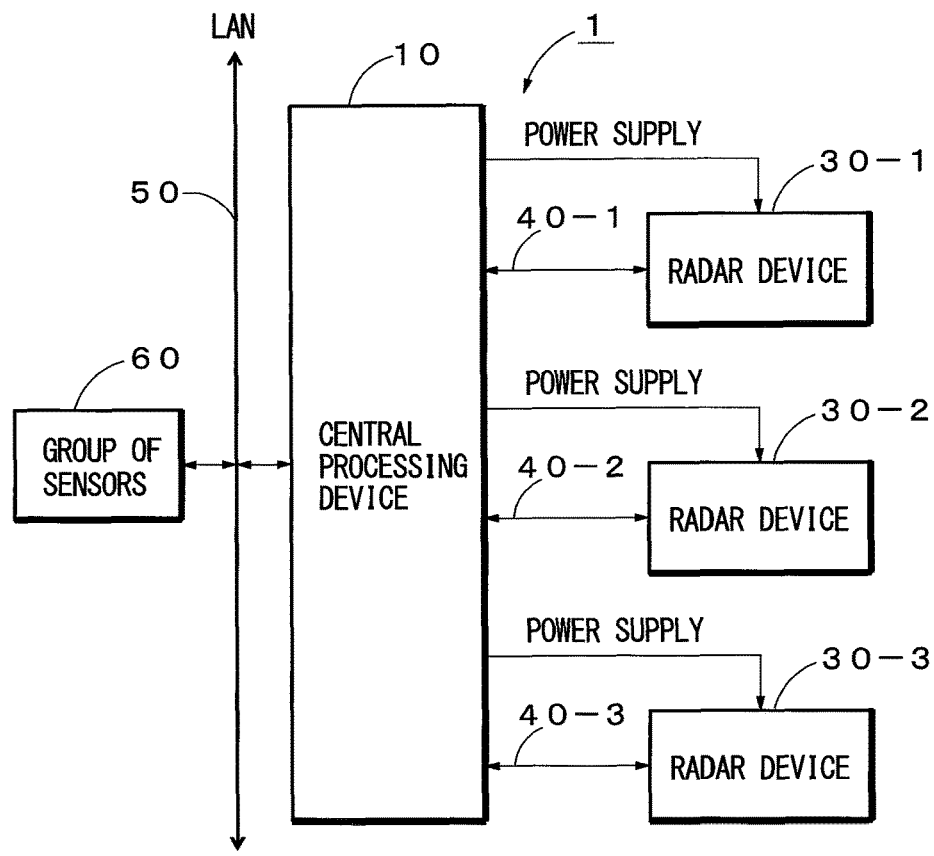
F I G. 1
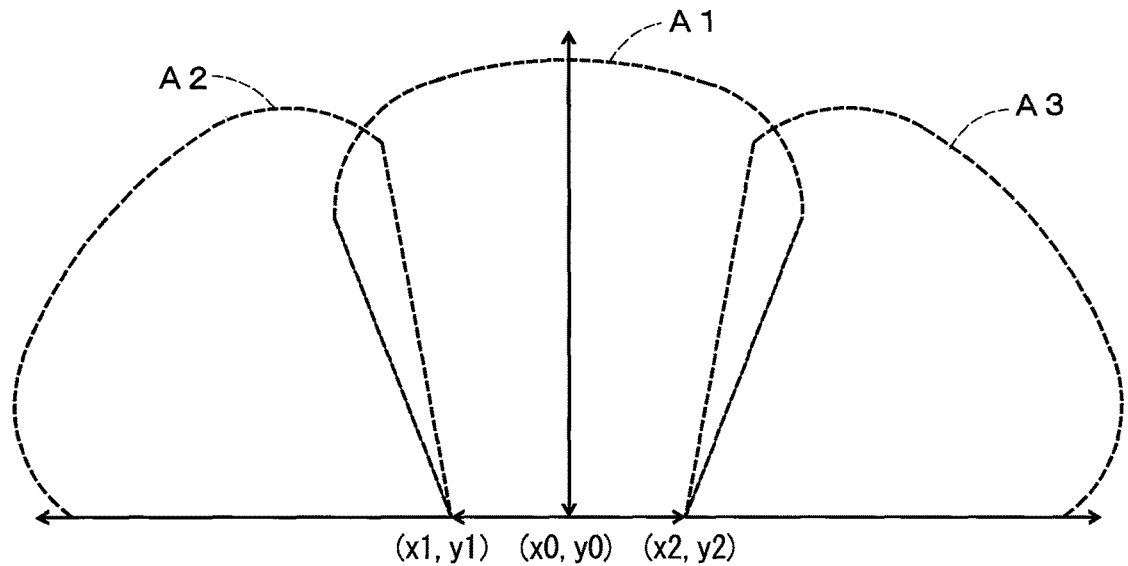
F I G. 6

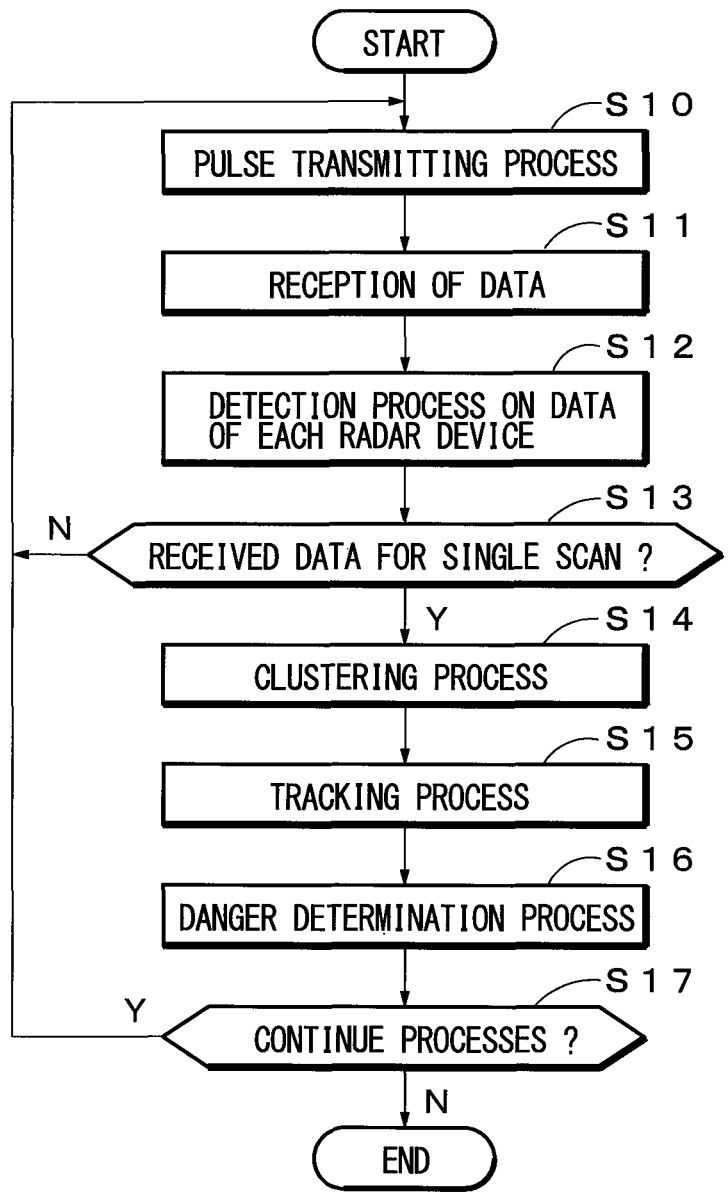
F I G. 4

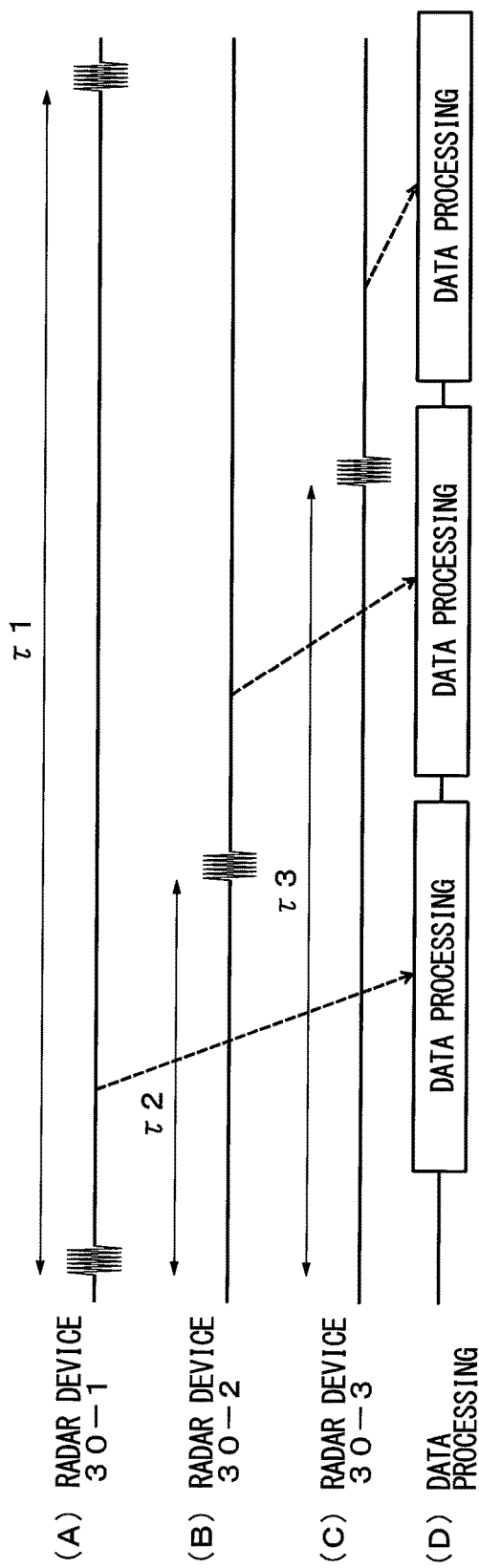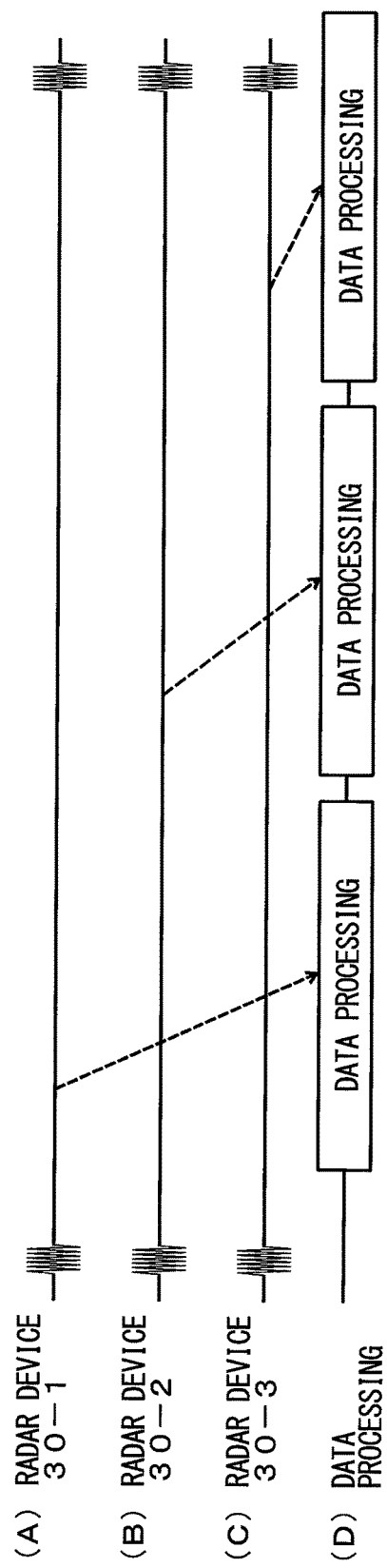

RADAR SYSTEM

CROSS REFERENCE TO RELATED APPLICATIONS

This is a continuation application of International Patent Application No. PCT/JP2013/062709 filed May 1, 2013, the full contents of which is hereby incorporated by reference in its entirety.

BACKGROUND

Technical Field

The present disclosure relates to a radar system.

Background

Recently, driver assistance safety systems are proposed in which a radar device adapted to detect an object around a host vehicle and an imaging device that images an image around the host vehicle are installed in a vehicle, and based on information detected by the radar device and the imaging device, control the vehicle to prevent an occurrence of a collision with other vehicles, etc., and to mitigate damages in case of a collision. As a method for implementing such a system, for example, H.-L. Bloecher et al., "79 GHz UWB automotive short range radar-Spectrum allocation and technology trends", Adv. Radio Sci., 7, PP. 61-65, 2009 proposes a technical concept of sensing all orientations of a vehicle with a radar.

Further, for example, techniques disclosed in Japanese Examined Patent Publication No. 5-51870 and Japanese Laid-open Patent Publication No. 2003-107151 are known as techniques of providing a plurality of radar devices or imaging devices, and detecting an object based on signals from these plurality of radar devices or the like.

When a pulse radar is used as a radar device, a variation in temporal difference between transmission and reception at the radar causes an error in range measurement, and thus, it is necessary to remove factors causing the variation as much as possible. For example, in a case where the temporal difference between transmission and reception is in a nanosecond order as in a short range radar, it is necessary to strictly control factors affecting the temporal difference between transmission and reception at the radar.

According to the technique disclosed in Japanese Examined Patent Publication No. 5-51870, pulse generating units and pulse receiving units of radar devices are provided as a common mechanism, and signals from a plurality of sensor sections are received unchanged as high frequency signals by the common mechanism. In this configuration, since the pulse receiving unit, which is a high frequency signal receiving unit, is provided in the common mechanism, a distance between an antenna and the pulse receiving unit also affects the temporal difference between transmission and reception at the radar. In other words, in order to solve the problem using the technique disclosed in Japanese Examined Patent Publication No. 5-51870, it is necessary to carry out a complicated management including management of the cable length between the radar devices and temperature management of the radar devices and the cables. Also, in a case where the distance between an antenna and a pulse receiving unit is long, there may be a case where a pulse waveform deforms under an influence of a transmission delay due to a cable between radar devices, and this may also become a degradation factor of a performance as a short range radar.

According to the technique disclosed in Japanese Laid-open Patent Publication No. 2003-107151, a plurality of sensor devices are controlled by a command control device. With such a configuration, an output from each of a plurality of sensor devices is transmitted to a command control device after being subject to signal processing, and thus power consumption as a radar system is large. Furthermore, Japanese Laid-open Patent Publication No. 2003-107151 discloses transmitting an output of a receiver unchanged to the command control device via a radio communication means, and since an output of the receiver is a video signal, when the wireless communication means is replaced with a wire transmission means, it becomes similar to the technique described in the aforementioned Japanese Examined Patent Publication No. 5-51870. Accordingly, it has a problem that a temporal difference between transmission and reception of the radar and a pulse waveform are affected.

Accordingly, the present disclosure is related to providing a radar system that can perform management of a temporal difference between transmission and reception and a pulse waveform of a high frequency signal from each of a plurality of radar devices in a facilitated manner such that an influence of a change in an operating environment is decreased and a power consumption of the system is reduced.

SUMMARY

According to an aspect of the present disclosure, the present disclosure is a radar system having a plurality of radar devices and a central processing device, each of the plurality of radar devices having a transmitting unit adapted to transmit a high frequency signal to an object, a receiving unit adapted to receive a signal reflected from the object, an individual control unit adapted to control timings of transmission and reception by the transmitting unit and the receiving unit, and a converting unit adapted to convert an output of the receiving unit into digital data, the central processing device having an integration process unit adapted to process a plurality of pieces of information transmitted from the plurality of radar devices in association with a plurality of pieces of positional information of the plurality of radar devices, a command control unit adapted to control operation timings of the individual control units of the plurality of radar devices, and a detection process unit adapted to perform a process for detecting the object on the digital data before being processed by the integration process unit, digital communication which is isolated from the control of timings of transmission and reception at the individual control unit of each of the plurality of radar devices is performed between the plurality of radar devices and the central processing device.

According to such configuration, timing management of transmission and reception of a high frequency signal of each of a plurality of radar devices can be performed in a facilitated manner such that an influence of a change in an operating environment, such as a temperature change, is decreased. Also, since the process of integrating data associated with an object is performed in the central processing device, it is not necessary to implement a means for performing an integration process on data in a radar main body or outside the radar system, and thus an introduction cost of the radar system can be reduced.

Further, in addition to the above disclosure, the detection process unit performs a process of detecting a position, a velocity and an angle of the object for each of the radar devices, and the integration process unit performs a process of identifying the object by integrating pieces of data indicating the position, the velocity and the angle detected by the detection process unit.

With such a configuration, the configuration of the radar device is simplified, and the power consumption and the cost of the radar device reduces, and, as a result, the cost of the entire system can be reduced.

Also, in addition to the above disclosure, each of the radar devices further includes an individual detection process unit adapted to perform, on the digital data that is an output of the converting unit, a part of the process for detecting the object.

With such a configuration, by performing a part of the detection process in the radar device, an amount of data transferred from the radar device to the central processing device can be decreased. Thereby, a low-rate interface can be used.

Further, the detection process unit performs a process of detecting a position, a velocity and an angle of the object for each of the radar devices, and the integration process unit performs a process of identifying the object by integrating pieces of data indicating the position, the velocity and the angle detected by the detection process unit.

With such a configuration, since an amount of data can be reduced, an amount of data transferred from the radar device to the central processing device can be decreased.

Further, the radar system further includes a danger determination unit adapted to determine whether a danger is present or not based on a relationship between the object and itself, based on the data of the object obtained by the integration process unit.

With such a configuration, based on the integrated information, determination of a danger can be performed over a broader region and accurately.

According to the disclosure, it is possible to provide a radar system that can perform management of a temporal difference between transmission and reception of a high frequency signal from each of a plurality of radar devices in a facilitated manner such that an influence of a change in an operating environment is decreased and a power consumption of the system is reduced.

BRIEF DESCRIPTION OF DRAWINGS

FIG. 1 is a diagram showing an example of a configuration of a radar system according to a first embodiment of the present disclosure.

FIG. 4 is a flow chart illustrating an example of a process performed in the central processing device shown in FIG. 2.

FIG. 5 is a diagram showing an example of a transmission timing of a pulse signal of each radar device.

FIG. 6 is a diagram showing an example of a detection range of each radar device.

FIG. 7 is a diagram showing an example of a transmission timing of a pulse signal of each radar device.

DETAILED DESCRIPTION

Figure 2:
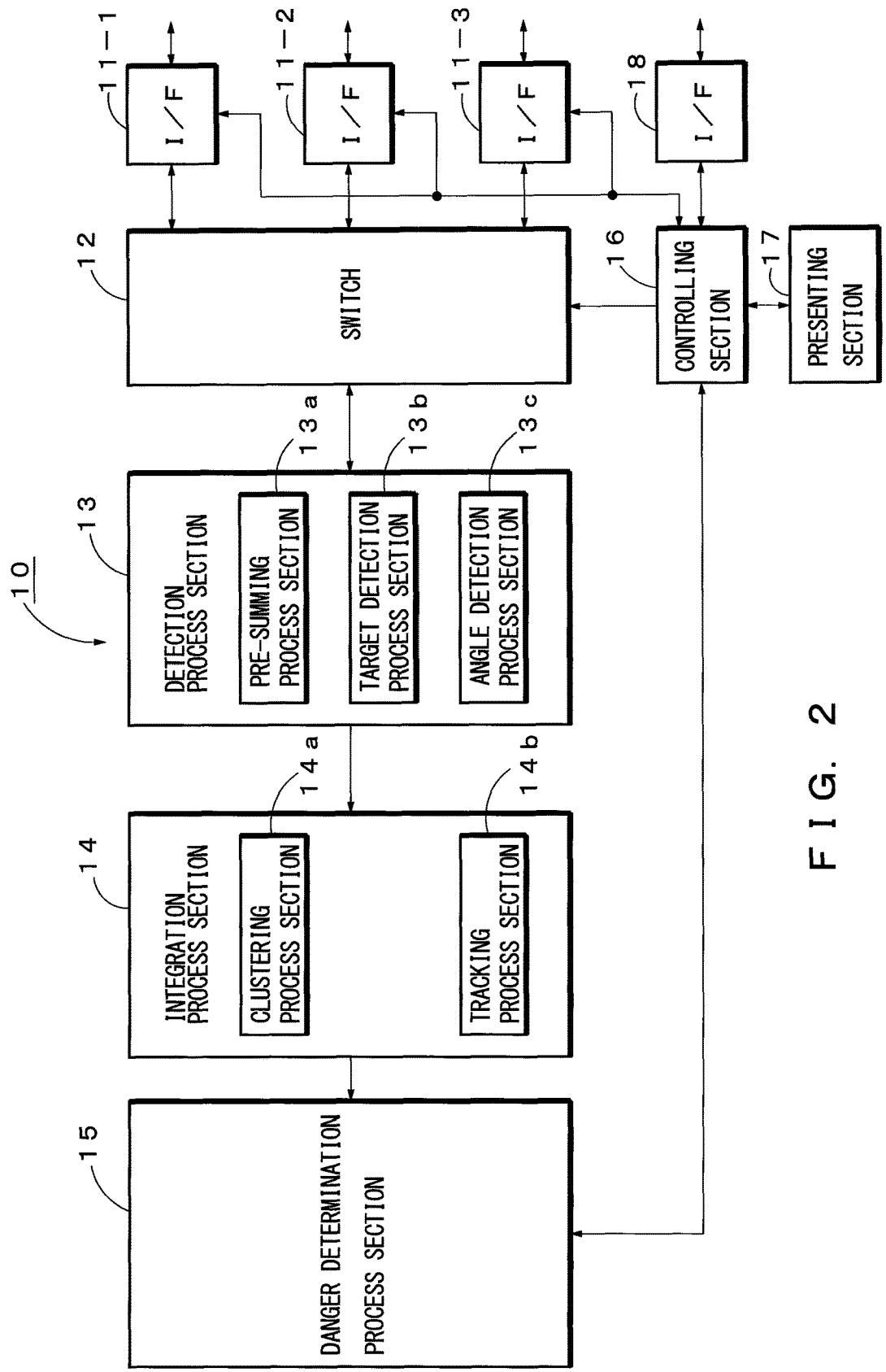
FIG. 2 is a diagram showing an example of a configuration of a central processing device shown in FIG. 1.

Further features of the present disclosure will become apparent from the following detailed description of exemplary embodiments with reference to the accompanying drawings.

The basic embodiment of the present disclosure is a radar system having a plurality of radar devices and a central processing device, and has the following features.

Each of the plurality of radar devices of this radar system has a transmitting unit adapted to transmit a high frequency signal to an object, a receiving unit adapted to receive a signal reflected from the object, an individual control unit adapted to control timings of transmission and reception by the transmitting unit and the receiving unit, and a converting unit adapted to convert an output of the receiving unit into digital data.

The central processing device of this radar system has an integration process unit adapted to process a plurality of pieces of information transmitted from the plurality of radar devices in association with a plurality of pieces of positional information of the respective plurality of radar devices, a command control unit adapted to control operation timings of the individual control units of the plurality of radar devices, and a detection process unit adapted to perform a process for detecting the object on the digital data before being processed by the integration process unit.

Also, digital communication which is isolated from the control of timings of transmission and reception at the individual control unit of each of the plurality of radar devices is performed between the plurality of radar devices and the central processing device. This digital communication is managed, for example, in a milli-second (ms) order.

According to such a configuration, management which is performed in a nano-second (ns) order, such as management of a temporal difference between transmission and reception and a pulse waveform of a high frequency signal from each of a plurality of radar devices can be performed in a facilitated manner such that an influence of a change in an operating environment is decreased. Also, by performing a process of integrating data associated with the object in the central processing device, cooperation between the central processing device and each of the radar devices is performed effectively. Also, it is not necessary to implement a means for performing an integration process of data in the main body of the radar or outside the radar system, and an introduction cost of the radar system can be reduced.

Hereinafter, a specific radar system will be described. The following description solely provided by way of example of the present disclosure, and the present disclosure is by no means limited to the scope described below.

(A) Description of a Configuration of a First Embodiment

FIG. 1 is a diagram showing an example of a configuration of a radar system according to a first embodiment of the present disclosure. As shown in this diagram, a radar system 1 includes a central processing device 10, radar devices 30 (30-1 to 30-3), a LAN (Local Area Network) 50 and a group of sensors 60. Note that, the radar system 1 is, for example, mounted in vehicles such as automobiles and motorcycles.

The central processing device 10 performs digital communication with the radar devices 30 (30-1 to 30-3) through signal lines 40-1 to 40-3 that synchronizes operations of the radar devices. The central processing device 10 receives digital data from the radar devices 30 (30-1 to 30-3), which digital data being transmitted through the signal lines 40-1 to 40-3, and detects an object. Further, presence or absence of a danger is determined from a positional relationship between the detected object and a host vehicle, and a result of determination is presented. Also, the central processing device 10 supplies a power supply electric power to the radar devices 30 (30-1 to 30-3). Note that the signal lines 40-1 to 40-3 may be signal lines capable of providing digital communication, which is isolated from transmission-reception control in each radar device, between the central processing device 10 and the radar devices 30 (30-1 to 30-3), and, for example, it is possible to use signal lines conforming to the LVDS (Low Voltage Differential Signaling) specification, but other signal lines which are other than signal lines conforming to the LVDS specification can be used.

The radar device 30 (30-1 to 30-3) transmits, for example, a high frequency pulse signal and receives a reflected wave which is reflected off an object, and after having converted it into digital data (digital baseband signal) by A/D (Analog to Digital) conversion, sends it to the central processing device 10.

The LAN 50 is provided for exchanging information between the central processing device 10 and other devices or systems. For example, other devices or systems may be the group of sensors 60. Note that, in the case of an in-vehicle network, although a CAN (Controller Area Network) is generally used as the LAN 50, a network other than a CAN may be used. The group of sensors 60 includes a plurality of sensors for detecting the state of the host vehicle. Specifically, the group of sensors 60 includes a vehicle speed sensor, a steering angle sensor and a yaw rate sensor. Of course, sensors other than these may be included.

FIG. 2 is a diagram showing an example of a detailed configuration of the central processing device 10 shown in FIG. 1. As shown in FIG. 2, the central processing device 10 includes I/Fs (interfaces) 11-1 to 11-3 and 18, a switch 12, a detection process section 13, an integration process section 14, a danger determination process section 15, a command controlling section 16 and a presenting section 17.

The I/Fs 11-1 to 11-3 are interfaces for transmitting and receiving digital data between the central processing device 10 and the radar devices 30 (30-1 to 30-3), respectively. Note that the I/Fs 11-1 to 11-3 are set in accordance with the specification of the signal lines 40-1 to 40-3, and although interfaces in conformity with the LVDS specification are used in the present embodiment, it is possible to use interfaces other than the LVDS specification.

The switch 12 selects one of the I/Fs 11-1 to 11-3 in accordance with the control of the command controlling section 16, and supplies data received by these I/Fs to the detection process section 13.

The detection process section 13 has a pre-summing process section 13*a*, a target detection process section 13*b* and an angle detection process section 13*c*, and performs a pre-sum process, a target detection process and an angle detection process on data received from each of the radar devices 30 (30-1 to 30-3), to detect presence or absence of a target (object), angles, or the like in the data received from each of the radar devices, and supplies them to the integration process section 14.

The integration process section 14 has a clustering process section 14*a* and a tracking process section 14*b*, and by performing an integration process on a piece of information of an object from each of the radar devices detected by the detection process section 13, these pieces of information are integrated to identify the object and supplied to a danger determination process section 15.

The danger determination process section 15 determines whether a danger is present or not based on positional information, velocity information, angle information, etc. of an object supplied from the integration process section 14 and information on the host vehicle supplied from the group of sensors 60, and in a case where it is determined that a danger is present, informs the command controlling section 16. Thereby, information indicating a danger is presented by, for example, the presenting section 17.

The command controlling section 16 exchanges information with the radar devices 30 (30-1 to 30-3) through the I/Fs 11-1 to 11-3, and synchronizes operation timings of the radar devices. Also, the command controlling section 16 selects a radar device 30 (30-1 to 30-3) by controlling the switch 12, and receives data. Further, in a case where the danger determination process section 15 has determined that there is a danger, the command controlling section 16 causes the presenting section 17 to present information indicating a danger. The presenting section 17 is, for example, constituted by a LED (Light Emitting Diode), a buzzer, or the like, and presents to a driver that the host vehicle is in a dangerous state. Of course, it may be constituted by devices other than LEDs or buzzers (e.g., liquid crystal displays). Note that the command controlling section 16 can control the switch 12 to receive data from some of the radar devices.

The I/F 18 receives information from the group of sensors 60 through the LAN 50 shown in FIG. 1 and supplies information through the LAN 50 to an ECU (Electronic Control Unit), not shown. The I/F 18 is setup in accordance with specifications of the LAN 50. In the present disclosure, the I/F 18 is compatible with CAN, but may also be compatible with networks other than CAN.

Figure 3:
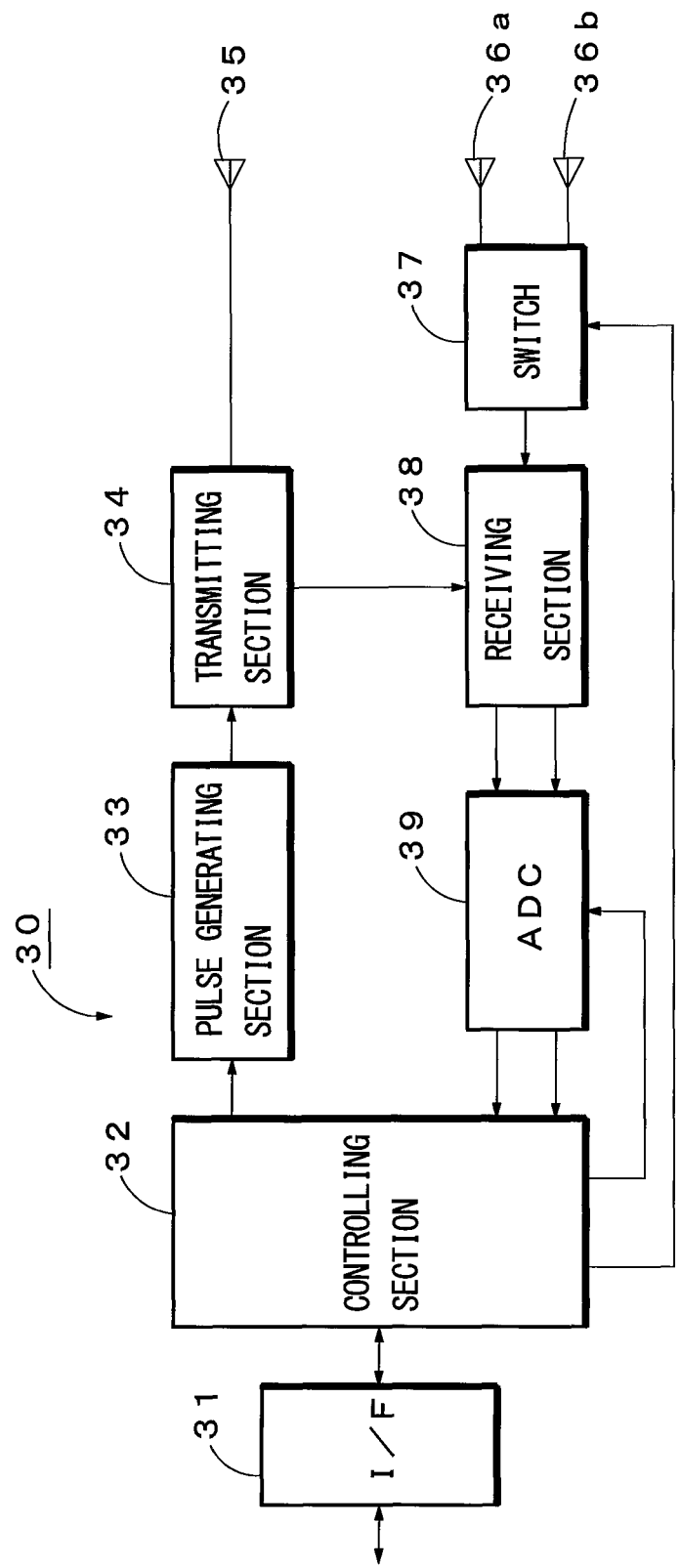
FIG. 3 is a diagram showing an example of configuration of a radar device shown in FIG. 1.

FIG. 3 is a diagram showing an example of a configuration of a radar device 30 (30-1 to 30-3) shown in FIG. 1. For the sake of simplicity of explanation, it is assumed that the radar devices 30 (30-1 to 30-3) have similar configurations. In the following description, these are described as the radar device 30.

As shown in FIG. 3, the radar device 30 has an I/F 31, an individual controlling section 32, a pulse generating section 33, a transmitting section 34, a transmitting antenna 35, receiving antennas 36*a* and 36*b*, a switch 37, a receiving section 38 and an ADC (Analog to Digital Converter) 39.

The I/F 31 is an interface for transmitting and receiving digital data between the radar device 30 (30-1 to 30-3) and the central processing device 10. Here, the I/F 31 is, similarly to the I/Fs 11-1 to 11-3, setup in accordance with the specification of the signal lines 40-1 to 40-3. In the present embodiment, an interface conforming to a LVDS specification is used, but interfaces other than the LVDS specification may also be used.

The individual controlling section 32 controls the pulse generating section 33 to transmit a high frequency pulse signal towards an object, and, supplies digital data, which is supplied from the ADC 39, to the central processing device 10 via the I/F 31. Also, the individual controlling section 32 performs digital communication with the central processing device 10 via the I/F 31 to synchronize operations of the radar devices 30 (30-1 to 30-3). Thereby, an operation timing of the radar device 30 (30-1 to 30-3) which is managed, for example, in a millisecond (ms) order, and a transmit and receive timing of the high frequency pulse signal which is managed, for example, in a nanosecond (ns) order are both controlled.

The pulse generating section 33 generates pulse signals in response to the control by the individual controlling section 32 and supplies them to the transmitting section 34. The transmitting section 34 upconverts the pulse signals supplied from the pulse generating section 33 to a predetermined frequency band into high frequency pulse signals, and transmits them to the object via the transmitting antenna 35. More particularly, the pulse generating section 33 generates, for example, pulse signals with a baseband having a pulse width of about 1 ns, and the transmitting section 34 may be configured to upconvert the pulse signals to, for example, a quasi-millimeter wave band or a millimeter-wave band (specifically, 24 GHz to 28 GHz, 76 GHz to 81 GHz, etc.) and radiate them from the transmitting antenna 35. Of course, frequencies may be frequencies other than these frequencies. The transmitting antenna 35 radiates high frequency signals supplied from the transmitting section 34 into free space.

The receiving antennas 36a and 36b are constituted by antennas having similar characteristics that are disposed with a predetermined distance apart, and receives a reflected wave reflected by the object and supplies it to the switch 37.

The switch 37 is controlled by the individual controlling section 32, and selects either the receiving antenna 36a or the receiving antenna 36b, and supplies the reception signal to the receiving section 38. The receiving section 38 performs IQ demodulation on the reception signal supplied from the switch 37, and outputs an I signal and a Q-signal having phases that are mutually orthogonal to each other. The ADC 39 is controlled by the individual controlling section 32, and performs equivalent time sampling, which performs sampling by shifting the sampling start timings by a predetermined time interval, on the I signal and the Q-signal (analog signals) supplied from the receiving section 38, and converts them into digital data and supplies them to the individual controlling section 32. Note that, instead of equivalent time sampling, conversion into digital data may be performed by normal sampling.

In this manner, by providing an output of the radar device 30 (30-1 to 30-3) as digital data, management of a temporal difference between transmission and reception as well as a pulse waveform of a high frequency signal from the radar device 30 (30-1 to 30-3), which is, for example, managed in a nanosecond (ns) order, are closed in the radar device, and thus can be positively isolated from matters that are managed in a millisecond (ms) order such as communication between the central processing device 10 and the radar device 30 (30-1 to 30-3). Also, there is an advantage that an influence of a change in an operating environment of the central processing device 10 and the radar device 30 (30-1 to 30-3) is reduced.

Note that, in the aforementioned configuration, the signal to be output from the receiving antennas 36a and 36b is selected by the switch 37, but, for example, the signal to be output from the receiving antennas 36a and 36b may be converted into a sum signal and a difference signal by a hybrid circuit and the sum signal and the difference signal may be selected by the switch 37.

(B) Description of an Operation of the First Embodiment

Hereinafter, an operation of the first embodiment will be described. FIG. 4 is a flow chart for explaining an example of a process performed in the central processing device 10 shown in FIG. 1. When the process of this flow chart is initiated, the following steps are performed.

In step S10, the command controlling section 16 instructs the radar device 30 (30-1 to 30-3) to transmit high frequency pulse signals at a predetermined timing. As a result, at the radar devices 30 (30-1 to 30-3), high frequency pulse signals are transmitted at different timings (time shared control), as shown in FIG. 5, for example. In the example shown in FIG. 5, the radar device 30-1 transmits a high frequency pulse signal at period $\tau$. The period $\tau$ is in the order of 0.1 ms to 10 ms, and a pulse width of the high frequency pulse signal is usually in the order of 0.1 ns to 10 ns. Here, the radar device 30-2 transmits a high frequency pulse signal after time $\tau 2$ has elapsed since the radar device 30-1 has transmitted a high frequency pulse signal, and the radar device 30-3 transmits a pulse signal after time $\tau 3$ has elapsed since the radar device 30-1 has transmitted a high frequency pulse signal. Accordingly, reflected waves from an object can be prevented from interfering. Specific values of $\tau 2$ and $\tau 3$ can be determined by taking a transfer rate and a processing speed of the I/F into consideration, and as an example, they can be set at timings obtained by dividing $\tau 1$ into three ($\tau 2 = \tau 3 - \tau 2 = \tau 1 - \tau 3$). Of course, timings other than these may be employed.

In step S11, the command controlling section 16 receives data from the radar devices 30 (30-1 to 30-3) which have been transmitted through the signal lines 40-1 to 40-3. More particularly, in the radar device 30 (30-1 to 30-3), the high frequency pulse signal transmitted at timings shown in FIG. 5 is captured by the receiving antennas 36a and 36b. Since the switch 37 is switched by the individual controlling section 32 every time a high frequency pulse signal is transmitted, the reflected wave captured by one of the receiving antennas 36a and 36b is input to the receiving section 38. At the receiving section 38, IQ demodulation is performed on a reception signal supplied from the switch 37, and an I signal and a Q-signal having phases orthogonal to each other are output. The ADC 39 samples the I signal and the Q-signal supplied from the receiving section 38 based on a range gate signal, which is a gate signal indicating the distance from a radar device, and converts them into digital data and supplies it to the individual controlling section 32. The individual controlling section 32 transmits the digital data to the central processing device 10 via the I/F 31. As a result, in the central processing device 10, the command controlling section 16 controls the switch 12 to select the corresponding I/F among the I/Fs 11-1 to 11-3, and receives the digital data and supplies it to the detection process section 13.

In step S12, the detection process section 13 performs a detection process on data received from each radar device. In other words, the detection process section 13 performs a time sharing (time division) process, and, as shown in FIG. 5, when reception of data from each radar device is complete, performs data processing. More particularly, the pre-summing process section 13a adds and compresses a predetermined number of I-data and Q-data, which are data received by the same radar device and sampled in synchronous with the same range gate, into pre-summed values. The target detection process section 13b carries out, for example, a complex FFT process on the pre-summed I-data and Q-data, taking data of the I signal as a real part and data of the Q-signal as an imaginary part, and compares respective amplitude outputs corresponding to a range gate and a frequency gate with preset thresholds to detect the presence of an object. Further, a distance to an object is determined from the range gate for which an object is detected, and a relative velocity of an object is determined from the frequency gate which is a gate for determining the velocity. The angle detection process section 13c detects an angle formed with an object in accordance with, for example, a table indicating a relationship between a ratio of imaginary parts of the reception signal at two receiving antennas 36a and 36b and an angle.

In step S13, the command controlling section 16 determines whether data for a single scan has been received or not, and if it is determined that data for a single scan has been received (step S13: Yes), proceeds to step S14, and if not, it returns to step S10 and repeats similar processes. Here, a single scan means a period in which data for a single scan is sampled by equivalent time sampling. That is, in equivalent time sampling, the reception signal corresponding to a single pulse of transmission signal is sampled at a regular time interval, and the timing at which sampling is started is shifted by a small amount (by time α) for every single pulse. By performing this for a plurality of transmissions of pulse signals, a sampling result equivalent to that of sampling at time interval a is obtained. Specifically, considering an example of a single scan in which pulse signals are output from the pulse generating section 23 at a 1 ms interval and this is continuously performed for 50 ms, an equivalent time sampling is performed on a reception signal obtained for 50 times of pulse signal transmissions for a single scan. Note that the time interval of outputting pulse signals and the number of times of outputting a pulse signal in a single scan are not limited to those for the case described above, and may be set as appropriate.

In step S14, the integration process section 14 integrates pieces of data of the object received by the respective radar devices 30 (30-1 to 30-3) and detected by the detection process section 13, and performs a clustering process on the object included in the integrated data. More specifically, the detection process section 13 performs a process of detecting a target for each piece of data received by each of the radar devices 30 (30-1 to 30-3). Here, as schematically shown in FIG. 6, positions where the radar devices 30 (30-1 to 30-3) are located are a spatially displaced. More particularly, as shown in FIG. 6, in a case where a detection range of the radar device 30-1 is A1, a detection range of the radar device 30-2 is A2, and a detection range of the radar device 30-3 is A3, origins of these detection ranges are different. Accordingly, the clustering process section 14*a* adds values of the origins as offset values to the pieces of data of the respective radar devices to integrate the pieces of data onto a single coordinate system. Note that, in a case where the pieces of data are represented in a polar coordinate system, these can be integrated by, for example, adding the values of the origins as offsets after having converted into a rectangular coordinate system, or by performing a coordinate transformation in the polar coordinate system. When the integration process of the pieces of data is complete, the integrate clustering process section 14*a* groups the pieces of data for a single scan for which the integration process has been carried out, and defines each group (cluster) as a set of pieces of data associated with reflection on a single object, respectively. In the grouping of the detecting signal, a region having a predetermined shape is set, and a process of clustering a set of signals in the region into a single cluster is performed. For example, as a shape (cluster shape) of the region to be used for the clustering process, shapes such as a circle, an oval, and a rectangle can be used. Note that, it is preferable to provide overlaps between the detection ranges (A1 to A3) of the radar devices 30 (30-1 to 30-3), since an object which exists across the detection ranges can be easily detected as the same body.

In step S15, the tracking process section 14*b* performs a tracking process on the data which had been processed by the clustering process in step S14. Specifically, the tracking process section 14*b* compares the cluster group obtained in the clustering process with a position of each object previously obtained to determine which object is associated with the cluster group, and based on this, performs smoothing (averaging) of a position of each object, and performs a process of predicting a position at the next timing. Generally, the a-p filtering method and a Kalman filtering method may be used for smoothing and predicting a position in the tracking process.

In step S16, the danger determination process section 15 determines whether there is a possibility that an object comes into contact or collides with a host vehicle based on the position, the velocity and the angle of the object obtained by the tracking process in step S15 and on the position, the velocity and the steering angle of the host vehicle obtained from the group of sensors 60, and in a case where there is a possibility of coming into contact or colliding, determines that it is dangerous, and, for example, notifies the command controlling section 16. Thereby, information indicating that a danger is approaching is indicated at the presenting section 17.

In step S17, the command controlling section 16 determines whether to continue the process, and if it is determined to continue the process (step S17: Yes), it returns to step S10 and repeats processes similar to those in the aforementioned case, and if not, terminates the process (step S17: No).

As has been described above, in the first embodiment of the present disclosure, each of the radar devices 30 (30-1 to 30-3) transmits and receives a high frequency pulse signal and converts the high frequency pulse signal into digital data and transmits it to the central processing device 10, and, the central processing device 10 performs the detection process of the object and the integration process.

Since each of the radar devices 30 (30-1 to 30-3) independently manages the timing of sending out and the timing of receiving the high frequency pulse signal in a nano second (ns) order, for example, it is only necessary for the central processing device 10 to manage synchronization of the operation of each of the radar devices 30 (30-1 to-30-3) in a millisecond (ms) order, and it is not necessary for the central processing device 10 to manage the timing of the transmit and receive of each of the radar devices 30 (30-1 to 30-3) in a nanosecond (ns) order, for example. Therefore, a process load of the central processing device 10 is reduced, and the radar devices 30 (30-1 to 30-3) can transmit and receive the pulses at an appropriate timing.

Also, in the aforementioned first embodiment, since it is configured such that each of the radar devices 30 (30-1 to 30-3) has a reduced processing amount, a unit price of the radar device 30 (30-1 to 30-3) can be decreased, and in a case where a plurality of radar devices are used, the cost for an entire system can be reduced.

Also, in the aforementioned first embodiment, since the central processing device 10 performs the detection process in a time shared manner, the detection process section 13 can be used in common, and the equipment cost of the central processing device 10 can be reduced. Further, since the radar devices 30 (30-1 to 30-3) transmit high frequency pulse signals at different timings, transmission waves and reflected waves can be prevented from interfering between the radar devices.

Also, in the aforementioned first embodiment, since the integration process section 14 integrates the pieces of data detected in the radar device 30 (30-1 to 30-3) and performs a clustering process and a tracking process, an object which exists across the detection ranges A1 to A3 of the radar devices 30 (30-1 to 30-3) can be positively detected.

Note that, in the aforementioned first embodiment, as shown in FIG. 5, high frequency pulse signals are transmitted in a time shared manner, but, for example, as shown in FIG. 7, high frequency pulse signals may be transmitted at generally the same timing and the pieces of data obtained by the ADC 39 may be transmitted to the central processing device 10 after adjusting the time. More specifically, the radar devices 30 (30-1 to 30-3) generally transmit high frequency pulse signals at the same timing, and, in the example shown in FIG. 7, converts them into digital data by the ADC 39 and stores them in a memory, not shown. It is also possible for the central processing device 10 to request transmission of data in a predetermined order, e.g., in the order of the radar devices 30 (30-1 to 30-3), and receive the transmitted data and perform the detection process and the integration process as mentioned above. According to such embodiment, the control of causing a high frequency pulse signal to be transmitted to the radar devices 30 (30-1 to 30-3) can be simplified. Further, instead of the central processing device 10 managing the timing of the data transmission from the radar devices 30 (30-1 to 30-3), for example, the central processing device 10 may perform bus arbitration (bus arbitration) based on requests from the radar devices 30 (30-1 to 30-3), and, for example, may assign the right to use on a first-come-first-served basis.

(C) Description of a Configuration of a Second Embodiment

Figure 8:
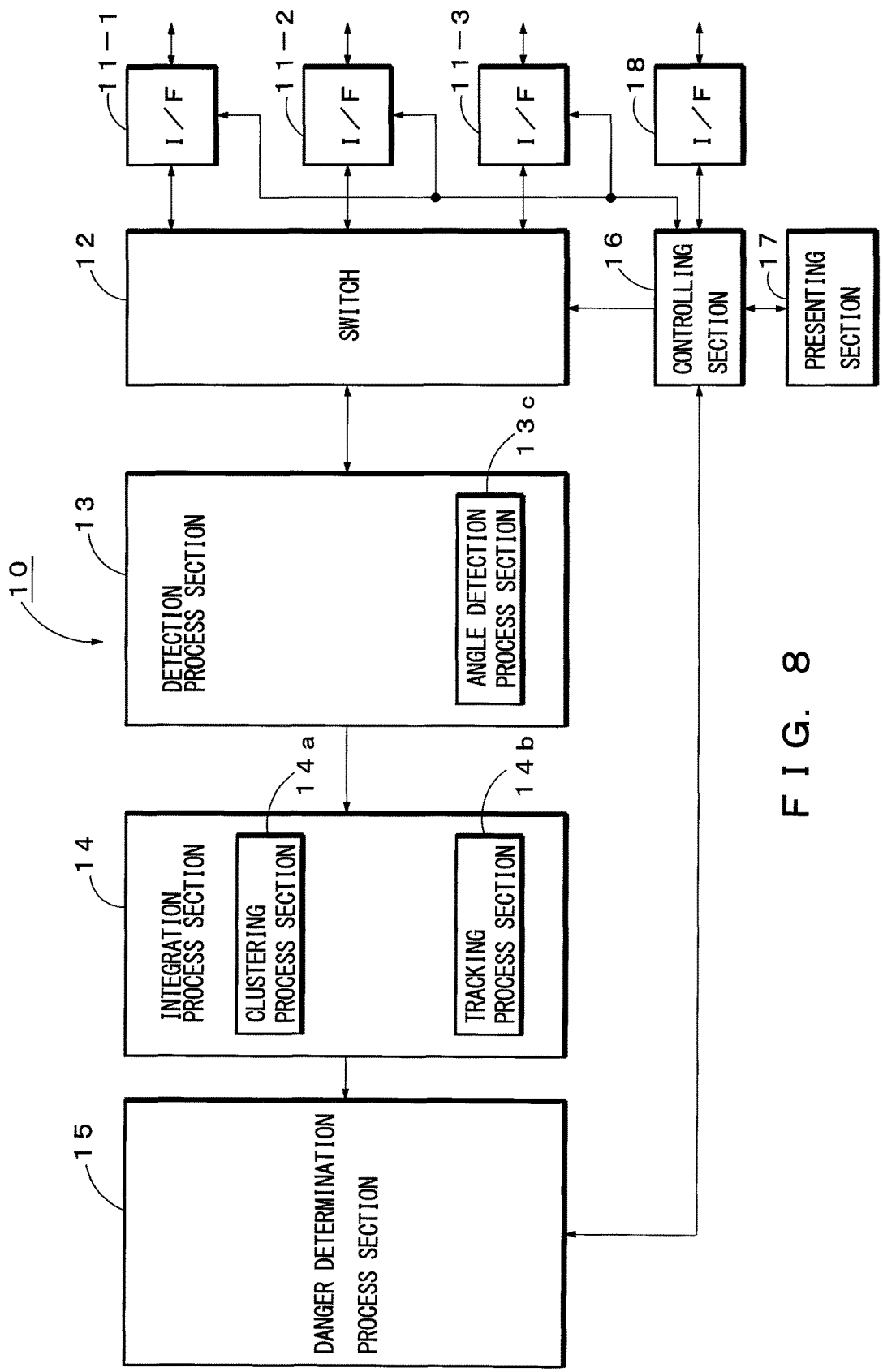
FIG. 8 is a diagram showing an example of a configuration of the central processing device according to a second embodiment of the present disclosure.
Figure 9:
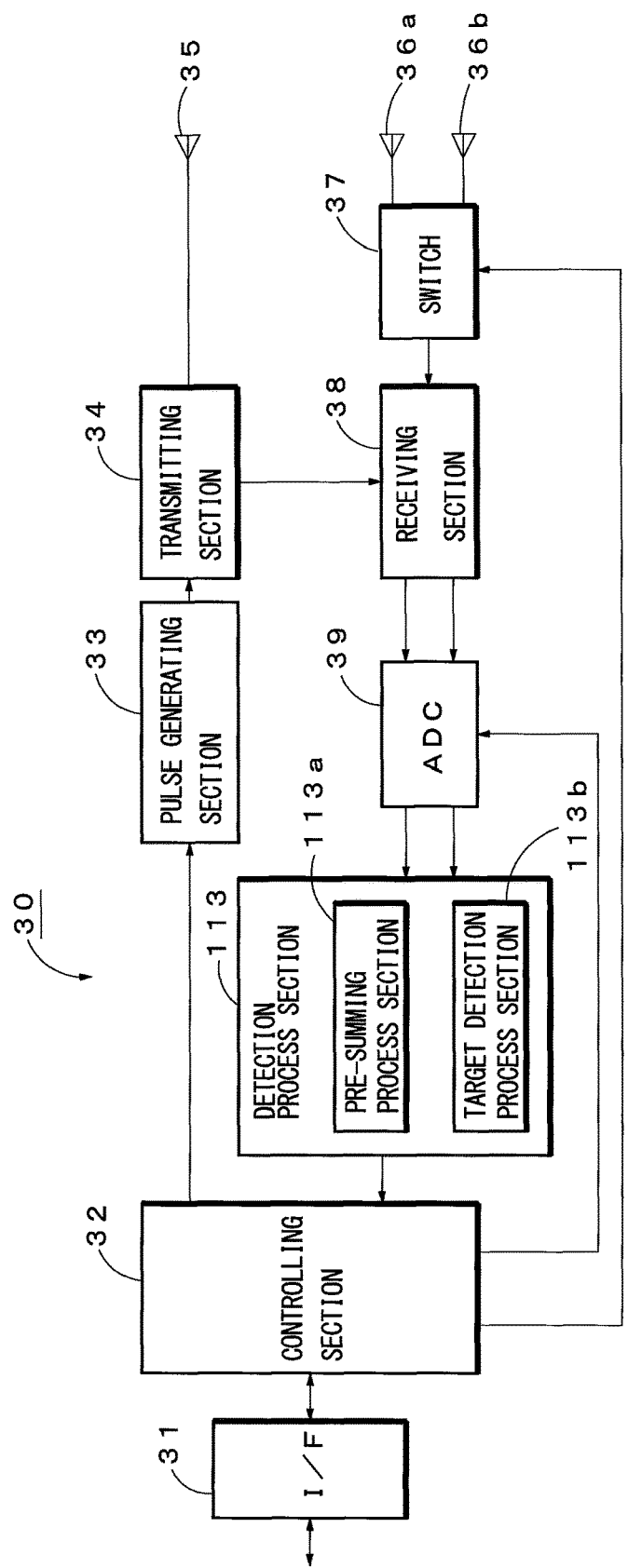
FIG. 9 is a diagram showing an example of a configuration of the radar device according to the second embodiment of the present disclosure.

The second embodiment will now be described. FIGS. 8 and 9 are diagrams showing an example of a configuration of the second embodiment of the present disclosure. Note that in these drawings, portions corresponding to those in FIGS. 2 and 3 are indicated with the same reference numerals and descriptions thereof are omitted. In the central processing device 10 shown in FIG. 8, the pre-summing process section 13a and the target detection process section 13b are removed from the detection process section 13, as compared to FIG. 2. Elements other than those are similar to those shown in FIG. 2.

The radar device 30 shown in FIG. 9 is provided with a detection process section 113 between an ADC 39 and a controlling section, as compared to FIG. 3. Elements other than this is similar to those shown in FIG. 3. The detection process section 113 has a pre-summing process section 113a and a target detection process section 113b, and a pre-sum process and a target process are performed on pieces of digital data supplied from the ADC 39, and output to the individual controlling section 32. The pre-summing process section 113a and the target detection process section 113b have functions similar to the pre-summing process section 13a and the target detection process section 13b shown in FIG. 2. That is to say, in the second embodiment shown in FIGS. 8 and 9, the pre-summing process section 13a and the target detection process section 13b are removed from the central processing device 10 shown in FIG. 3, and the pre-summing process section 113a and the target detection process section 113b are added to the radar device 30 (30-1 to 30-3).

(D) Description of an Operation of the Second Embodiment

In the second embodiment, when there is a request from the central processing device 10, the radar devices 30 (30-1 to 30-3) transmit high frequency pulse signals at timings shown in FIG. 5 or at timings shown in FIG. 7. The reflected waves received at the respective receiving sections 38 of the radar devices 30 (30-1 to 30-3) are converted into pieces of digital data by the ADC 39 and supplied to the detection process section 113. In the detection process section 113, a pre-sum process is performed at the pre-summing process section 113a, and after a target has been detected at the target detection process section 113b, it is supplied to the individual controlling section 32. The individual controlling section 32 transmits information related to the detected target to the central processing device 10 via the I/F 31.

In the central processing device 10, the switch 12 selects I/Fs 11-1 to 11-3 and receives pieces of data (pieces of data after the target detection process) transmitted from the radar devices 30 (30-1 to 30-3) and supplies them to detection process section 13. In the detection process section 13, the angle detection process section 13c performs a process of detecting an angle of the target that was detected in each of the radar devices 30 (30-1 to 30-3) and supplies it to the integration process section 14. In the integration process section 14, similarly to the case of the aforementioned first embodiment, an integration process is carried out on pieces of information related to a target detected in the respective radar devices 30 (30-1 to 30-3) supplied from the detection process section 13. More specifically, the clustering process section 14a integrates coordinate systems of the pieces of data associated with a target detected at the respective radar devices 30 (30-1 to 30-3) and performs a clustering process. Also, the tracking process section 14b performs a tracking process on the pieces of data that has been subjected to a clustering process and outputs them to the danger determination process section 15. The danger determination process section 15 determines whether a danger is present based on data output from the integration process section 14 and data from the group of sensors 60, and in a case where it is determined that a danger is present, notifies the command controlling section 16 and causes the presenting section 17 to indicate predetermined information.

As described above, according to the second embodiment of the present disclosure, since a part of the detection process is performed in each of the radar devices 30 (30-1 to 30-3), an amount of data transmitted from the radar devices 30 (30-1 to 30-3) to the central processing device 10 can be reduced, and thus a low rate interface can be used as an interface between the radar devices 30 (30-1 to 30-3) and the central processing device 10. Particularly, since the pieces of data that have been subject to processes up to the target detection process have a considerably reduced data amount, the transmission speed required for the interface is reduced in comparison to the first embodiment.

(E) Description of Variant Embodiments

The aforementioned embodiments are described by way of example, and the present disclosure is by no means limited to those described above. For example, in the aforementioned second embodiment, instead of the pre-summing process section 13a and target detection process section 13b in the central processing device 10 shown in FIG. 2, the pre-summing process section 113a and the target detection process section 113b are placed in the radar device 30 (30-1 to 30-3), but, for example, at least one of the pre-summing process section 13a, the target detection process section 13b and the angle detection process section 13c may be placed. However, placing all of them is not preferable because reduction of the power consumption of the radar devices 30 (30-1 to 30-3) cannot be achieved. Note that whether to place the pre-summing process section 13a, the target detection process section 13b, and the angle detection process section 13c in the central processing device 10 or in the radar devices 30 (30-1 to 30-3) can be determined depending on, for example, the cost of the device, the transmission rate of the interface, and power consumption of an entire system.

Also, in each of the aforementioned embodiments, a pre-sum process, a target process and an angle detection process are assumed as detection processes in the detection process section, but processes other than this may be included. For example, the detection process may include a relative velocity detection process, a position sensing process, and the like. Of course, processes other than these processes may be included.

Also, in each of the aforementioned embodiments, a single detection process section 13 is provided and pieces of data from the radar devices 30 (30-1 to 30-3) are processed by a time sharing process, but, for example, the radar devices may be provided by the same number as the detection process sections 13 to perform a parallel processing. In such a case, the switch 12 can be dispensed with. Also, only a part of detection process section 13 may be configured to perform a time sharing process. For example, only the pre-sum process or both the pre-sum process and the target process may be processed by a time sharing process. With such a configuration, by performing a parallel process on only the processes of a greater load, a processing speed can be improved with the cost being suppressed much as possible.

Also, in each of the aforementioned embodiments, the radar devices 30 (30-1 to 30-3) have the same configuration, but, for example, it is possible to make a difference in the performance (e.g., a processing speed or a target resolution) depending on the installation positions thereof and to assign a longer period of time for a radar device of a higher performance when performing a time sharing process. For example, in a case where the three radar devices 30 (30-1 to 30-3) are placed at the rear of a vehicle and at the center in the rear and at right and left in the rear, the performance of the radar device placed at the center in the rear can be made higher.

Also, in each of the aforementioned embodiments, three radar devices are provided, but two radar devices may be provided or four or more radar devices may be provided. Also, a short range radar, a middle-range radar, and a long-range radar may be provided in combination as appropriate.

Also, in each of the aforementioned embodiments, a case in which the radar system 1 is installed in a vehicle is given by way of example, but, for example, it may be installed in other mobile bodies such as aircrafts, ships, etc.

Also, in each of the aforementioned embodiments, description was made on the assumption that all radar devices 30 (30-1 to 30-3) are operated, but depending on a surrounding conditions of the radar system 1, it is possible to perform a control in which the central processing device 10 temporarily stops the operation (e.g., transmission and reception of a high frequency pulse signal, transmission of digital data, etc.) of some of the radar devices 30 (e.g., one of 30-1 to 30-3). As a result, the power consumption of the system can be further reduced.

What is claimed is:

1. A radar system comprising:
a plurality of radar devices each comprising at least one processor; and
a central processing device comprising at least one processor,
each of the plurality of radar devices having:
a transmitting unit configured to transmit a predetermined frequency signal to an object;
a receiving unit configured to receive a signal reflected from the object;
the at least one processor of each radar device being configured to control timings of transmission and reception by the transmitting unit and the receiving unit; and
an ADC (Analog to Digital Converter) configured to convert an output of the receiving unit into digital data,
the at least one processor of the central processing device being configured to process and integrate a plurality of pieces of information transmitted from the plurality of radar devices in association with a plurality of pieces of positional information of the plurality of radar devices;
the central processing device being further configured to control operation timings of the at least one processor of the plurality of radar devices; and
the central processing device being further configured to perform a part of processes for detecting the object on the digital data before being processed and integrated, wherein
digital communication which is isolated from the control of timings of transmission and reception at the at least one processor of each of the plurality of radar devices is performed between the plurality of radar devices and the central processing device, the at least one processor of each of the radar devices is further configured to perform, on the digital data that is an output of the ADC, another part of the processes for detecting the object, the another part of the processes including at least a pre-summing process,
the central processing device is further configured to perform a process of detecting a position, a velocity and an angle of the object of each of the radar devices,
the at least one processor of each of the radar devices is further configured to independently manage the control of timings so that a temporal difference between the transmission and reception by the transmitting unit and the receiving unit occurs within a range of about 0.1 nanoseconds to 10 nanoseconds, and
the central processing device is further configured to manage the operation timings of the at least one processor of the plurality of radar devices within a range of about 0.1 milliseconds to 10 milliseconds.

2. The radar system according to claim 1, wherein
the central processing device is further configured to perform a process of identifying the object by integrating pieces of data indicating the position, the velocity and the angle detected by each of the radar devices.

3. The radar system according to claim 1, wherein the central processing device is further configured to determine whether a danger is present or not based on a relationship between the object and itself, and based on the data of the object obtained by the pieces of information integrated from the plurality of radar devices.

* * * * *